March 25, 1958     H. H. HOPKINS     2,827,792
DAMPING DEVICE FOR WABBLER TYPE ENGINES
Filed Jan. 22, 1953     2 Sheets-Sheet 1

*INVENTOR.*
HOWE H. HOPKINS
BY
ATTORNEYS

March 25, 1958 H. H. HOPKINS 2,827,792
DAMPING DEVICE FOR WABBLER TYPE ENGINES
Filed Jan. 22, 1953 2 Sheets-Sheet 2

INVENTOR.
HOWE H. HOPKINS
BY
ATTORNEYS

United States Patent Office 2,827,792
Patented Mar. 25, 1958

2,827,792

DAMPING DEVICE FOR WABBLER TYPE ENGINES

Howe H. Hopkins, Chester, Pa., assignor to Samuel B. Eckert, Paoli, Pa.

Application January 22, 1953, Serial No. 332,598

5 Claims. (Cl. 74—60)

This invention relates to damping devices for wabbler type engines and has particular reference to the damping of the starplate motions in a mechanism of the floating wabbler type.

In an engine of the floating wabbler type the starplate is connected to the pistons by means of swivel bearings, called slippers, which slide and rotate in holes bored through the pistons. The slippers contain wrist pins which are slidably mounted in bushed holes in the arms of the starplate. With this arrangement the starplate is said to "float" on the inclined wabbler hub bearings, being restrained from rotating with the shaft only by the summation of certain components of the piston forces which in normal uniform engine operation tend to hold the arms substantially centrally on the wrist pins.

The superiority of this mechanism lies in its simplicity, since in normal operation no complicated gearing or linkage is required to keep the starplate centralized. However, certain conditions of operation, such as occur on deceleration, tend to upset the ideal equilibrium condition and permit the friction of the wabbler hub bearings to rotate the starplate sufficiently to allow the arms to strike the sides of the slippers, causing noise and ultimate damage to the mechanism.

In normal operation the wabbling of the inclined hub within the starplate causes the starplate arms to describe a geometrical pattern in the form of what may be called a spherical lemniscate, i. e. a figure 8 described on the surface of a sphere. In order to follow this pattern, the arms must slide slightly back and forth on the wrist pins, as well as rotate. No satisfactory mechanical means has been devised for absorbing the torque reaction of the starplate which will permit it to follow its peculiar oscillating motion. Of the many different mechanical methods of control proposed or tested, including special gearing, universal jointed linkages, spherical ended wrist pins, etc., none has proved successful.

Difficulties are particularly involved in engines in which the piston strokes are varied by changes of angular tilt of the wabbler hub relative to the main shaft. The amplitude of the lemniscate motions in a direction circumferential to the shaft must vary with the angularity of the wabbler hub.

Various proposals have been made to provide damping through the use of hydraulic-pneumatic dashpots or cushions, but none of these proposals has been successfully used. Rubber cushioning has been proposed but the cushions have been destroyed after only short periods of operation.

In accordance with the present invention, hydraulic-pneumatic damping is utilized, but under automatically controlled conditions to provide proper damping under abnormal conditions without interference with the normal relative movements which must occur between the starplate arms and the slipper wrist pins. In particular, the invention is applicable to engines involving variable piston strokes such as, for example, constitute constant compression engines of the type set forth in the application of Samuel B. Eckert, Serial No. 722,876, filed January 18, 1947.

The general object of the invention will become apparent from the foregoing and the attainment of this object and of various other objects relating particularly to details of construction and operation will be best understood from consideration of the following description with reference to the accompanying drawings, in which.

Except for the elements directly involved in providing the damping action discussed above, the engine to which the invention is applied is conventional and, accordingly, no attempt will be made herein to describe irrelevant details of such engine. The invention is shown as specifically applied to a wabbler type engine of constant compression type such as described in the above-mentioned Eckert application, but it will be evident that the invention is applicable quite generally to wabbler type engines whether or not they are of opposed piston type, or whether or not there are involved changes of angurality and position of a wabbler hub such as will give rise to variable piston strokes with or without constant compression features. In any such engine of the floating wabbler type a control is required to prevent abnormal movements of the starplate relative to the slippers, at the same time permitting the lemniscate motions referred to above.

Figure 1:
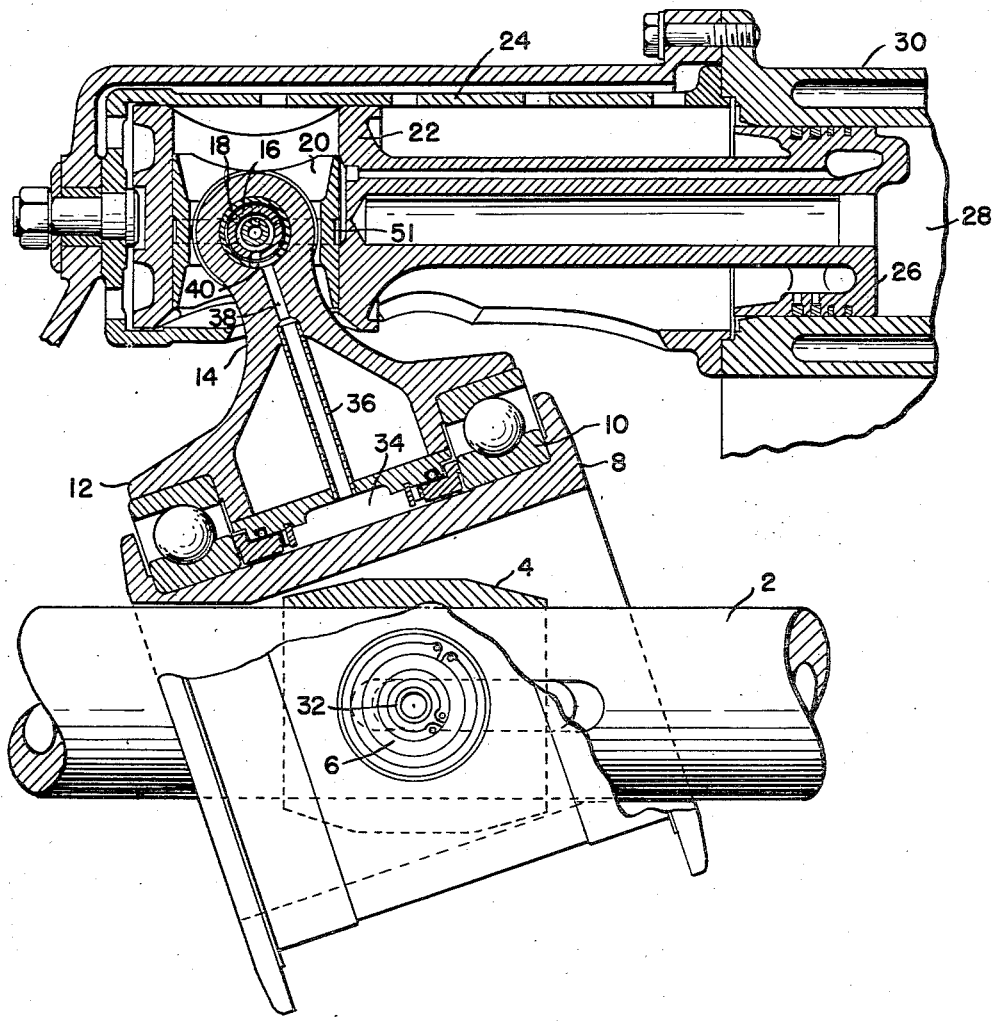
Figure 1 is a fragmentary sectional view of the wabbler mechanism of an internal combustion engine incorporating the damping arrangements involved in the invention.

Figure 1 shows sufficient of a wabbler type engine to make clear the application of the invention. The main shaft 2 has mounted thereon the trunnion sleeve 4, which is arranged for axial movement relative to the shaft in the case of an engine of constant compression type. Trunnion pins 6 mount on the trunnion sleeve the wabbler hub 8 the angular position of which with respect to the shaft may be fixed or adjustable utilizing means such as described in said Eckert application but which are not shown herein. The wabbler hub supports through the wabbler hub bearing 10 the starplate 12 which is provided with a number of arms 14 corresponding to the number of cylinders.

Each of the arms 14 is provided with a bushing 18 secured therein which embraces a wrist pin 16 mounted in a slipper 20 which is, in turn, received in a cylindrical transverse bore of the piston crosshead 22 arranged to reciprocate in a crosshead guide 24 axially aligned with the cylinder 28 which receives the piston head 26, the cylinders being formed in the main case of the engine. During operation each point of the starplate arm moves in the surface of a sphere concentric with the intersection of the axes of the main shaft 2 and the trunnion pins 6. The motion under normal conditions in such spherical surface is of the lemniscate type previously described. The amplitude of the lemniscate in a circumferential direction depends upon the angularity of the wabbler hub and involves a sliding motion of each starplate arm bushing relative to the wrist pin which it embraces. Under normal conditions of uniform speed of the main shaft, the lemniscate motions are of predetermined extent and symmetrical with respect to the center of the wrist pin.

In accordance with the invention, the damping dashpot action which is involved utilizes the pressure lubrication system which provides lubricant for the relatively moving parts between the main shaft and the crosshead guide. The lubricating oil under pressure passes from the interior of the main shaft 2 through the openings 32 in the removable kingpins, located within the trunnion pins 6, to the wabbler hub oil reservoir 34. Thence, in accordance with the present invention, the oil is led through tubes 36 to bores 38 in each starplate arm. These bores 38 communicate with circumferentially extended openings 40 in the bushings 18. The circumferential extents of these openings are such that proper delivery of lubricating oil is provided for all angular positions of the starplate arms.

Each bushing 18 is provided with an internal circumferential central groove 42 communicating with the corresponding opening 40. Each wrist pin 16 has located therein a distributing plug 44, each slipper 20 and its associated wrist pin 16 and distributing plug 44 being held in assembled relationship by a locking screw 46. Central openings 48 and 50 in the wrist pin 16 and distributing plug 44, respectively, are aligned with each other and receive lubricating oil from the groove 42 when the corresponding arm 14 of the starplate is in central position on the wrist pin and lead the oil to the central bore 52 of the distributing plug from which it flows to the annular groove 51 in the slipper and thence through passages 53 to the bearing surface of the piston crosshead. As will shortly appear, this flow of oil is intermittent and provides lubrication for the crosshead and slipper, oil also flowing outwardly from the groove 42 to provide lubrication of the wrist pin surface.

Figure 2:
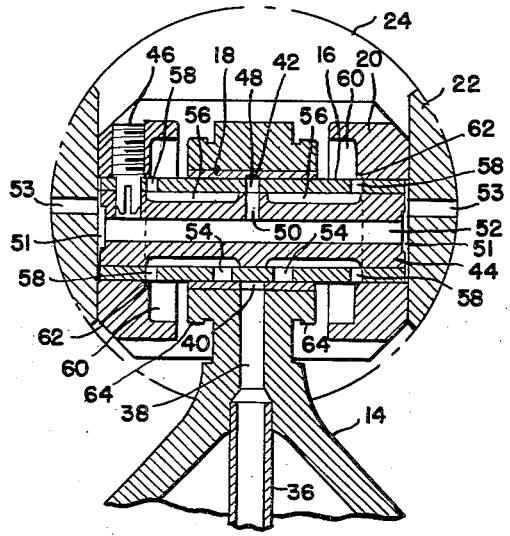
Figure 2 is a fragmentary section through an arm of a starplate, the wrist pin, slipper, and piston crosshead asociated therewith, showing the arm in its mid-position on the wrist pin.

A pair of radial openings 54 are provided in the wrist pin at positions on either side of its center such that, as viewed in Figure 2, these openings do not communicate with the opening 40 in the bushing 18 when the starplate arm is in its central position relative to the wrist pin. The respective openings 54 communicate with the annular channels 56 in the circumferential surface of the distributing plug 44. The channels communicate through openings 58 with the dashpot cylinders 60 provided in the form of bores in the slipper 20. Each of the openings 58 in the wrist pin communicates with a notch 62 formed in the slipper and providing an undercut to the end of the corresponding cylinder 60, the arrangement being such as to insure proper flow of oil and air when pistons 64 formed at opposite ends of the starplate arm are located closely adjacent to the bottoms of the cylinders. The pistons 64 are arranged to have only slight clearance with the cylindrical cylinder walls so that flow between the pistons and the cylinders is limited.

Indication has already been given of the distribution of the lubricating oil for lubrication of the relatively moving surfaces when the starplate arm is in its central, or approximately central position. This condition occurs four times during each revolution of the main shaft, and intermittent flow of lubricant is thus provided, adequate for proper lubrication.

Figure 3:
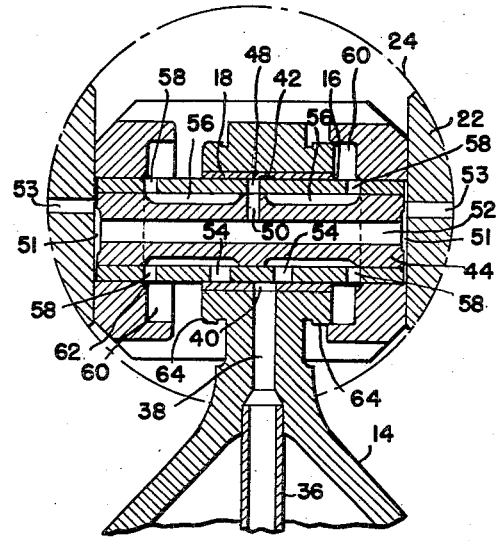
Figure 3 is a view similar to Figure 2 but showing displacement of the arm relative to the wrist pin at the start of dashpot action.

Figure 3 illustrates displacement of an arm 14 of the starplate to a position relative to its wrist pin corresponding to the start of dashpot action. As movement from central position takes place, the communication between groove 42 and opening 48 is cut off, and opening occurs between the opening 40 in the bushing and the opening 54 through the wrist pin on the side towards which motion takes place. This opening occurs just prior to entry of the corresponding piston 64 into its cylinder 60, and flow of oil then occurs from bore 38 through openings 40 and 54 and channel 56 into openings 58 and the cylinder on the corresponding side. The initial movement of oil tends to flush excess air from the wrist pin passages and cylinder. Then as the piston enters the cylinder the air and oil flow is restricted allowing pressure to build up in the cylinder. The small amount of air admixed with the oil provides a compressible fluid to reduce hydraulic shock or hammer when the piston first enters the cylinder.

The degree of damping or retarding force exerted on the starplate arm is proportional to the pneumatic and hydraulic pressure developed in the cylinder. Both static and dynamic hydraulic pressure are involved in the dash pot action. The static pressure is derived from the fact that the cylinder outlet (annular space around the piston) is made smaller than the cylinder inlet (passages in the wrist pin). The static pressure is always less than the oil reservoir pressure. The dynamic pressure results from the inward motion of the piston displacing the fluid in the cylinder and is responsible for the major portion of the retarding action on the piston under conditions of abnormal operations when damping action is required. Under conditions of severe operation the pressure, mostly dynamic, may exceed the oil reservoir pressure, in which case the oil flow thru the wrist pins is temporarily reversed as will be discussed in more detail later.

Figure 4:
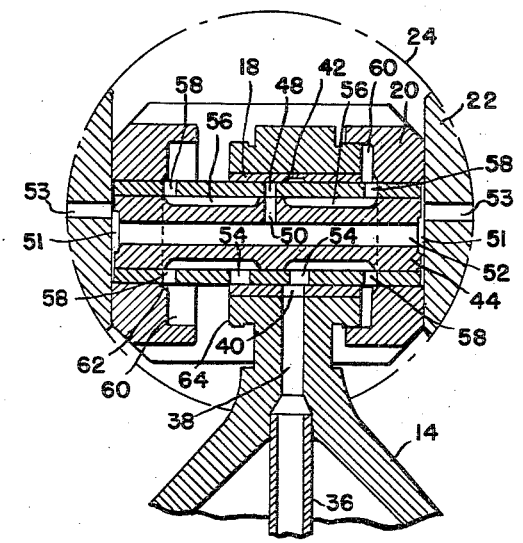
Figure 4 is a further view similar to Figure 2 but showing the maximum normal displacement of the arm relative to the wrist pin.

Figure 4 illustrates the maximum normal displacement from center of a starplate arm relative to the wrist pin, when the engine piston stroke is maximum, corresponding to maximum angularity between the starplate hub and the shaft. This position illustrated in Figure 4 involves some penetration of the dashpot piston into its cylinder, just sufficient to compress the trapped air but not enough to cause any appreciable build up of static or dynamic hydraulic pressure which would retard the piston action. The result is that, even when operating with maximum engine piston stroke, undesirable damping action is avoided. When operation occurs at smaller values of angularity and with smaller piston strokes, the off-center displacement is less than indicated in Figure 4 and the damping action is correspondingly less, in fact, for a substantial region of operation from minimum stroke of the pistons toward the maximum stroke the pistons will not enter the cylinders and, consequently, no damping action occurs.

Figure 5:
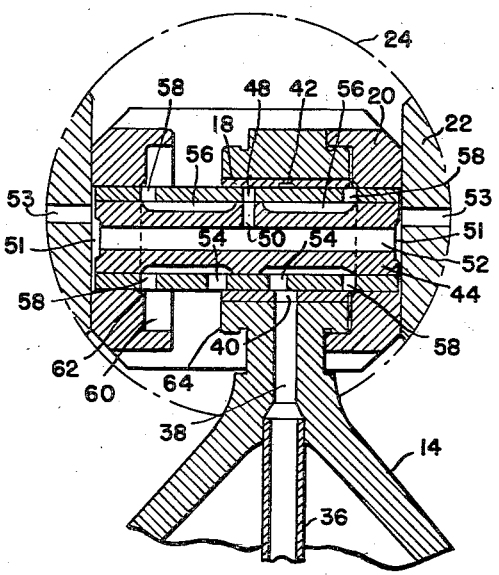
Figure 5 is a further view similar to Figure 2 but showing the maximum displacement of the arm relative to the wrist pin.

When, however, due to deceleration or other causes, the starplate arms tend toward abnormal displacements, the damping dashpot action comes into play by movement of the pistons beyond the position illustrated in Figure 4, displacing oil in the cylinder with build up of restraining pressure. Figure 5 illustrates the maximum displacement of the starplate arm from central position, involving metallic contact between the starplate arm and the slipper. At this time there is a very slight clearance of the piston with the bottom of its cylinder, and hydraulic lock is prevented by reason of this clearance and the presence of notches 62 providing communication between the clearance spaces and the openings 58 in the wrist pin.

It may be desirable under some conditions of operation, or to facilitate control of the piston leakage in manufacture, to utilize tapered cylinders and/or pistons, with or without longitudinal grooves in either pistons or cylinders. At low speeds of operation, particularly below idle speed, it will be evident that flow would occur to give rise to some pressure on the pistons 64 after they enter their cylinders, corresponding to the predetermined static pressure plus more or less dynamic pressure depending on the speed.

At normal speeds of operation the dynamic pressure becomes the dominating retarding force, its magnitude increasing more or less directly as the speed and/or depth of penetration of the piston into the cylinder.

In case of violent disturbance of the starplate, resulting in sudden maximum piston movement, the combined pressure in the cylinder may exceed the oil supply pressure, as previously mentioned, in which case the oil flow to the cylinders is reversed, thus permitting buildup of a very strong corrective force, but eliminating any tendency for hydraulic hammer to occur under extreme operating conditions.

In summary of the foregoing, it will be evident that the invention provides not only normal lubrication, applied intermittently, but at sufficient frequency to be completely adequate, but a damping arrangement is provided which exercises negligible effect on the normal displacements of the starplate arms relative to their wrist pins while providing effective damping action whenever the displacements tend to become so excessive as to give rise to the probability that without damping there would occur metal-to-metal contacts which would de destructive and extremely noisy. The results are secured by virtue of the metering action of the oil flow and proper control by the relative movements of the parts.

What is claimed is:

1. In an engine of the wabbler type having a plurality of cylinders arranged about a main shaft with their axes parallel to the shaft axis and pistons reciprocating in the cylinders, an inclined hub member mounted on the shaft, a starplate mounted on said hub member and having arms, means providing oil to the arms of said starplate, and means connecting each of said arms to a corresponding piston, the last named means comprising a crosshead connected to the piston, a slipper within said crosshead, a wrist pin within the slipper embraced by the arm, said arm having sliding movement along the wrist pin, elements carried by the slipper and arm providing a pair of dashpot cylinders and pistons, and means controlled by movements of the arm relative to the wrist pin for providing oil to said dashpot cylinders, the last named means including means providing ports in the arm and wrist pin and passages within the wrist pin.

2. In an engine of the wabbler type having a plurality of cylinders arranged about a main shaft with their axes parallel to the shaft axis and pistons reciprocating in the cylinders, an inclined hub member mounted on the shaft, a starplate mounted on said hub member and having arms, means providing oil to the arms of said starplate, and means connecting each of said arms to a corresponding piston, the last named means comprising a crosshead connected to the piston, a slipper within said crosshead, a wrist pin within the slipper embraced by the arm, said arm having sliding movement along the wrist pin, elements carried by the slipper and arm providing a pair of dashpot cylinders and pistons, and means controlled by movements of the arm relative to the wrist pin for providing oil to said dashpot cylinders, the last named means providing oil to said dashpot cylinders only when the arm departs substantially from a central position relatively to the wrist pin, the last named means including means providing ports in the arm and wrist pin and passages within the wrist pin.

3. In an engine of the wabbler type having a plurality of cylinders arranged about a main shaft with their axes parallel to the shaft axis and pistons reciprocating in the cylinders, an inclined hub member mounted on the shaft, a starplate mounted on said hub member and having arms, means providing oil to the arms of said starplate, and means connecting each of said arms to a corresponding piston, the last named means comprising a crosshead connected to the piston, a slipper within said crosshead, a wrist pin within the slipper embraced by the arm, said arm having sliding movement along the wrist pin, elements carried by the slipper and arm providing a pair of dashpot cylinders and pistons, and means controlled by movements of the arm relative to the wrist pin for providing oil to said dashpot cylinders, the last named means providing oil to said dashpot cylinders only when the arm departs substantially from a central position relatively to the wrist pin, the last named means including means providing ports in the arm and wrist pin and passages within the wrist pin, and means controlled by movements of the arm relative to the wrist pin for supplying oil to the engaging surfaces of the slipper and crosshead.

4. In an engine of the wabbler type having a plurality of cylinders arranged about a main shaft with their axes parallel to the shaft axis and pistons reciprocating in the cylinders, an inclined hub member mounted on the shaft, a starplate mounted on said hub member and having arms, means providing oil to the arms of said starplate, and means connecting each of said arms to a corresponding piston, the last named means comprising a crosshead connected to the piston, a slipper within said crosshead, a wrist pin within the slipper embraced by the arm, said arm having sliding movement along the wrist pin, elements carried by the slipper and arm providing a pair of dashpot cylinders and pistons, and oil passages within said wrist pin providing for oil flow between said arm and said dashpot cylinders only when the arm departs substantially from a central position relatively to the wrist pin.

5. In an engine of the wabbler type having a plurality of cylinders arranged about a main shaft with their axes parallel to the shaft axis and pistons reciprocating in the cylinders, an inclined hub member mounted on the shaft, a starplate mounted on said hub member and having arms, means providing oil to the arms of said starplate, and means connecting each of said arms to a corresponding piston, the last named means comprising a crosshead connected to the piston, a slipper within said crosshead, a wrist pin within the slipper embraced by the arm, said arm having sliding movement along the wrist pin, elements carried by the slipper and arm providing a pair of dashpot cylinders and pistons, and oil passages within said wrist pin providing for oil flow between said arm and said dashpot cylinders only when the arm departs substantially from a central position relatively to the wrist pin and providing for oil flow between said arm and the engaging surfaces of the slipper and crosshead only when the arm is approximately centrally located relatively to the wrist pin.

References Cited in the file of this patent

UNITED STATES PATENTS

| | | |
|---|---|---|
| 1,997,279 | Chilton | April 9, 1935 |
| 2,139,189 | Hall | Dec. 6, 1938 |
| 2,341,203 | Borer | Feb. 8, 1944 |